Patented Jan. 23, 1951

2,538,941

UNITED STATES PATENT OFFICE 2,538,941

PROCESS FOR PRODUCING AROMATIC SULFIDE AND THE RESULTANT PRODUCTS

Alexander Douglas Macallum, London, Ontario, Canada

No Drawing. Application January 29, 1948, Serial No. 5,188

15 Claims. (Cl. 260—79)

This invention relates to a process for producing aromatic sulfides and to new compositions comprising aromatic sulfide condensation products.

Aromatic sulfides have heretofore been prepared from unsubstituted aromatic hydrocarbons by the reaction of sulfur or sulfur halides in the presence of catalysts, such as aluminum chloride or iodine. Such methods give good results in making certain compounds, such as phenyl or o-phenylene sulfides, but are not applicable to the production of the more complex aromatic sulfides. Furthermore, they are objectionable from the standpoint that they involve the use of aluminum chloride or iodine catalysts. For the production of the more complex aromatic sulfides it has been necessary heretofore to first form the corresponding sulfonates by roundabout methods or through the hydrocarbon halides by way of the organo metallic compounds. It has also been suggested to react aromatic halides with sodium sulfides in aqueous or alcoholic solutions at elevated temperatures. The presence of water or alcohol in the reaction mixture complicates the reaction, results in undesirable side reactions and in the production of aromatic sulfides of inferior quality.

It is an object of this invention to provide a process for producing aromatic sulfides, which process eliminates the technical difficulties encountered in the procedures heretofore employed and is more economical to practice.

Another object of this invention is to provide new aromatic sulfide condensation products of wide commercial utility including resins comprising aromatic sulfides.

Other objects and advantages of this invention will be apparent from the following detailed description thereof.

I have made the surprising discovery that by fusing a nuclearly substituted aromatic chloride with a sulfide of a metal from the group consisting of the alkali and alkaline earth metals in the presence of sulfur at a temperature of 275° to 360° C. a metathetical reaction takes place between the aromatic chloride and the metal sulfide, which reaction proceeds smoothly, resulting in the production of the desired aromatic sulfide in high yield. The process of this invention involves the use of a dry reaction mixture. No water, alcohol or other solvent is employed in the reaction mixture which consists of the aromatic chloride, sulfur and a metal sulfide added as such or produced in situ in the reaction mixture by adding to the reaction mixture an alkali or alkaline earth metal monoxide, carbonate or borate which metal oxide or salt reacts with the sulfur to form the sulfide. If desired, instead of adding sulfur and a metal sulfide, a metal polysulfide may be employed which on decomposition under the reaction conditions produces free sulfur and the metal sulfide.

As the nuclearly substituted aromatic chloride, any nuclearly chlorinated aromatic compound may be used. Thus, the aromatic nuclei may be mononuclear, as for example, phenyl, tolyl, etc., dinuclear, as for example, naphthalene, diphenyl, etc., or trinuclear, as for example, terphenyl. The aromatic nuclei may be free from further substituents, or they may contain one or more substituents in addition to the chlorine substituent, such, for example, as alkyl substituents. Preferred nuclearly chlorinated aromatic compounds are the chlorinated benzenes such as orthodichlorobenzene, paradichlorobenzene, monochlorobenzene and mixtures of such chlorinated benzenes. 1,2,4-trichlorobenzene, 1,2,4,5-tetrachlorobenzene and hexachlorobenzene may be reacted in accordance with the process of this invention. The term "aromatic chlorides" or "aromatic chloride" is used in the specification and claims in a broad sense to include nuclearly substituted mono and poly chlorinated aromatic compounds.

The preferred alkali or alkaline earth metal sulfides are the sulfides of sodium, potassium, magnesium, calcium, barium or lithium. Particularly preferred are the sodium sulfides because of their cheapness and ready availability. As above indicated, the alkali or alkaline earth metal sulfide need not be added as such to the reaction mixture but may be formed in situ by the reaction of monoxide, carbonate, or borate of an alkali or alkaline earth metal with sulfur. Alternatively, the sulfide may be formed in the reaction mixture by the decomposition of an alkali or alkaline earth metal polysulfide. When the sulfide is formed in situ I have found the reaction to form the desired aromatic sulfide takes place more readily and hence it is preferred to follow the procedure of producing the sulfide in situ.

If an aromatic monosulfide is desired, the reaction mixture should consist of the nuclearly substituted aromatic chloride, sulfur and an alkali or alkaline earth metal monosulfide, or an alkali or alkaline earth metal monoxide, carbonate or borate instead of the monosulfide. Employing the monosulfide, the amount of free sulfur used should be relatively small, i. e., sufficient to catalyze the reaction between the monosulfide and the aromatic chloride. When using an alkali or alkaline earth metal monoxide, carbonate or borate, a substantially larger amount of free sulfur is used sufficient to react with the monoxide, carbonate or borate to form the sulfide and leave a small excess of free sulfur in the reaction mixture.

When it is desired to produce aromatic polysulfides, an alkali or alkaline earth metal polysulfide may be employed. Alternatively, an alkali or alkaline earth metal monosulfide with enough free sulfur to produce the desired aromatic polysulfide may be used. If desired, an alkali or alkaline earth metal monoxide, carbonate, or borate and sufficient free sulfur to produce the desired aromatic polysulfide may be employed. As the alkali or alkaline earth metal polysulfide, the di, tri, tetra, penta or hexa sulfides may be used; the polysulfides of sodium are preferred because of their ready availability. The expressions "alkali and alkaline earth metal sulfides," or "alkali and alkaline earth metal sulfide" are used herein in a broad sense to include both the mono and poly sulfides of the alkali and alkaline earth metals.

As above indicated, the amount of sulfur employed in the reaction mixture depends largely on the chemical composition of the desired aromatic sulfide and the other constituents of the reaction mixture, i. e., whether a monosulfide or polysulfide of an alkali or alkaline earth metal is employed, or whether in lieu of such monosulfide or polysulfide, a monoxide, carbonate or borate of alkali or alkaline earth metal is used. From .1 to .25 atom of sulfur per molecule of metal sulfide will give substantially complete conversion of aromatic chloride to aromatic sulfide in a reaction mixture fused at 300° C. for about 20 hours. In general, there should be enough sulfur present in the reaction mixture to catalyze the reaction between the alkali or alkaline earth metal sulfide and the aromatic chloride to produce the desired aromatic sulfide. The free sulfur, as above indicated, appears to catalyze the reaction between the aromatic chloride and the alkali or alkaline earth metal sulfide added as such or produced in situ; also it may result in the formation of unstable metal polysulfides which react with the aromatic chloride to form the desired aromatic sulfide and possibly to some extent as a solvent for the other reactants. It will be understood that this invention is not to be limited to the above theory or possible explanation as to the function of the sulfur in the reaction mixture; suffice it to say the presence of the sulfur, I have surprisingly found, causes the fusion reaction to take place between the aromatic chloride and metal sulfide added as such or produced in situ, whereas when the free sulfur is omitted such reaction does not take place.

If not enough (1) sulfide, (2) polysulfide, or (3) alkali or alkaline earth metal monoxide, carbonate or borate along with sulfur to produce in situ the alkali or alkaline earth metal sulfide or polysulfide is incorporated in the reaction mixture, the replacement of chlorine will not be complete and the end product will contain some aromatic chloride. If a substantial excess of sulfide or sulfide forming material is used, the end product will contain just so much more sulfur. To obtain a phenylene monosulfide resin the reactants should be proportioned to avoid an excess of sulfur in the end product. To obtain preferred phenylene polysulfide condensation products only enough sulfur should be present in the reaction mixture to produce a phenylene product containing the desired amount of sulfur.

The reaction is carried out at a pressure equivalent to the partial pressure of the aromatic chloride at the reaction temperature. Thus in the case of chlorobenzene, the reaction may be carried out at a pressure of from 10 to 45 atmospheres. When reacting high boiling chlorinated aromatics such, for example, as dichlorinated-m-terphenyl, the reaction may be carried out at approximately atmospheric pressure under nitrogen or carbon dioxide. In general the pressure is permitted to build up in the reaction vessel, e. g., by the carbon dioxide generated when an alkali or alkaline earth carbonate is employed as a constituent of the reaction mixture. If desired, however, this carbon dioxide may be purged to maintain the pressure at any desired level.

It is important that the reaction be carried out in a dry condition, i. e., the above noted reactants be fused in the absence of any solvent. By so doing I have found undesired side reactions are eliminated and the desired product is obtained in high yield. Further it is preferred to form the sulfide in situ in the reaction mixture because by so doing the formation of the desired aromatic sulfide takes place more readily. When, for example, sodium carbonate is employed along with sulfur in the reaction with para-dichlorobenzene, it is believed two reactions take place, namely, (1) formation of metal sulfide and (2) reaction of metal sulfide with the aromatic dichloride in the presence of sulfur. The first reaction appears to be the slower; hence, an excess of alkali metal carbonate may and preferably is used over and above that required to react with the sulfur to form the sulfide. This excess of carbonate will not interfere with completion of the metathesis reaction between the aromatic chloride and the alkali metal sulfide formed in situ, provided a slight excess of sulfur is used over that required to replace the chlorine in the aromatic chloride. Until all the chlorine has been replaced, using such excess of sulfur, there is always enough sulfur present for catalysis purposes due to the differences in the two reaction rates.

The process of this invention results in the production of resins having the empirical formula $C_6H_4S_x$ where $x$ is equal to a value from 1 to 5 or more.

The reaction between p-dichlorobenzene, calcium sulfide and sulfur, for example, may be represented by the following equation

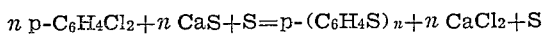

$$n\text{ p-}C_6H_4Cl_2 + n\text{ CaS} + S = \text{p-}(C_6H_4S)_n + n\text{ CaCl}_2 + S$$

The resins derived from p-dichlorobenzene, m-dichlorobenzene, mixtures of such chlorinated benzenes, other dichlorinated aromatic compounds including diphenyl, diphenyl ether, terphenyl and naphthalene derivatives, are practically insoluble in sodium sulfide solutions, exhibit no dyeing properties, have high molecular weights, in some cases estimated, from their physical properties, at 35,000 to 70,000 grams, the tensile and flexural strengths of certain p-phenylene sulfide resins running at 13,000 to 15,000 pounds per square inch in the unplasticized state, the low chlorine content (0.1%) of these high strength resins is also in agreement with molecular weights in this range. The resins are light colored, cream to canary yellow in the powdered state, have a high thermal stability, and are of high chemical stability, except towards strong oxidizing agents, such as nitric acid. After fusing or pressing they take on the character of glasses, but with rise in temperature they become resilient and finally pass into a plastic state. When plasticized with sulfur the phenylene disulfide and polysulfide resins are mostly rubber-like in properties and readily dissolve on heating with organic disulfides, such as phenyl disulfide or tetramethylthiuram disulfide. They are otherwise sparingly soluble in organic solvents.

Resins produced from reaction mixtures including aromatic monochloride along with the dichloride, on the other hand are relatively low melting, of low viscosity and molecular weight and are soluble in organic solvents.

Resins produced from 1,2,4-trichlorobenzene, 1,2,4,5-tetrachlorobenzene or hexachlorobenzene are insoluble, yellow to green pigments, having no dyeing effects and which do not fuse at temperatures up to 450° C.

More specifically phenylene monosulfide resins having an empirical formula $C_6H_4S_x$ where $x$ is equal to a value from 1 to 1.25, have a sulfur content of from 30% to 34% and are made by reacting p-dichlorobenzene, sulfur and a metal sulfide, preferably produced in situ by the reaction of sodium carbonate and sulfur, the reaction mixture consisting of 3.3 parts of p-dichlorobenzene, 3.5 to 3.7 parts of sodium carbonate and 1.1 to 1.2 parts of sulfur and being fused for about 20 hours at 300° C. under pressure. The resultant novel resins have a chlorine content of about .1%, a molecular weight of from 35,000 to 70,000 grams, are insoluble in sulfur at 132° C., are practically insoluble in acids, such as hydrochloric and sulfuric acids, dissolve with decomposition in hot strongly oxidizing acids, such as nitric or chrome sulfuric acid, are practically insoluble in alkalis, substantially insoluble in organic solvents, are thermally stable at temperatures up to and above 300° C., show practically no water absorption, have good surface hardness about the same as polystyrene resins, have brittle points of from 10° to below −60° C., soften at 100° to 120° C., are resilient from the softening points up to from 215° to 240° C., become transparent at 255° to 270° C., are plastic in form from 260° to from 450° to above 500° C., and have tensile strengths at 18.3° C. of from 5,000 to 13,000 pounds per square inch and corresponding flexural strengths of from 5,000 to 14,000 pounds per square inch.

Phenylene di- and polysulfide resins having an empirical formula corresponding to $C_6H_4S_x$ where $x$ is equal to a value from 2 to 5 have a sulfur content of from 48% to 68% by weight and are made by reacting p-dichlorobenzene, sulfur and a metal sulfide, preferably produced in situ by reacting sodium carbonate and sulfur, the reaction mixture consisting of 3.3 parts by weight of p-dichlorobenzene, 3.9 parts of sodium carbonate and 2.35 to 4.5 parts of sulfur and being fused for about 20 hours at 300° C. under pressure. The resulting resins have a chlorine content of about .4%, a molecular weight of from 9,000 to 17,000 grams, are soluble in sulfur at 132° C., have a relative viscosity of more than 20, are practically insoluble in acids, such as hydrochloric and sulfuric acids, dissolve with decomposition in hot strongly oxidizing acids, such as nitric acid or chrome sulfuric acid, are practically insoluble in alkalis, are sparingly soluble in organic solvents, soluble in organic disulfides, thermally stable at temperatures above 300° C., show practically no water absorption, have a high surface hardness, vary in brittle points from 50° to 70° C. and in softening points from 55° to 80° C. depending on composition, are resilient from the softening points up to from 165° to 180° C., are plastic from 140° to 340° C., fuse above 340° C., and have relatively low tensile and flexural strengths.

Soluble mixed sulfide resins having an empirical formula corresponding to $$C_6H_5S_x(C_6H_4S_x)_nC_6H_5$$

where $x$ has a value of from 1 to 3 and $n$ a value of from 5 to 7 have a sulfur content of from 27% to 55% by weight and are made by reacting p-dichlorobenzene, monochlorobenzene, sulfur and a metal sulfide, preferably produced in situ by reacting sodium carbonate and sulfur, the reaction mixture consisting of 2.7 to 3 parts of p-dichlorobenzene, .85 to 5 parts of monochlorobenzene, 3.9 parts of sodium carbonate, 1.1 to 3 parts of sulfur and being fused for 20 hours at 300° C. under pressure. The resultant resins have a molecular weight of from 750 to 1500 grams, are soluble in sulfur at 132° C., have a relative viscosity of from 2 to 5, are insoluble in acids, such a hydrochloric and sulfuric acids, are insoluble in alkalis, are soluble in some organic solvents, such as carbon bisulfide or benzene, are thermally stable at temperatures up to and above 300° C., show practically no water absorption, have high surface hardness, become brittle at temperatures of from 15° to 20° C., soften at temperatures of 20-30° C., are non-resilient, are plastic within the range of 22° to 70° C., fuse completely at above 70° C. and are of low tensile and flexural strengths.

Unless otherwise specified the organic solvents referred to above are the alcohols, ketones, acids, esters, hydrocarbons, halo hydrocarbons, phenols, ethers and organic bases. Parts and percentages are on a weight basis. The relative viscosity is determined as follows: a mixture of .4 gram of the resin and 7.6 grams of sulfur is heated at 132° C. in a long, narrow test tube surrounding a straight capillary viscosimeter pipette. The average discharge time for the solution from this pipette is noted as well as the average discharge time for sulfur itself at the same temperature, desirably 132° C., which is maintained by heating the sulfur and sulfur solutions over refluxing chlorobenzene. The relative viscosity is equal to the time of discharge of the solution divided by the time of discharge of the sulfur alone.

The molecular weights of the soluble mixed sulfide and polysulfide resins are determined by the Rast micro-melting point method using camphor as the solvent, or by the Barger micro-isothermal distillation method using carbon bisulfide as the solvent. The molecular weights of the phenylene monosulfide resins, which are of higher molecular weight, are estimated on the basis of the chlorine content and physical strength, the former giving a measure of the maximum molecular weight, the latter an approximation of the degree of polymerization. The molecular weights of these resins cannot be determined by conventional methods because of their general insolubility in organic solvents at temperatures up to 150° C. and in sulfur. The molecular weights of the phenylene polysulfide resins have been determined experimentally by isothermal distillation in sulfur at 300° C. and by a comparison of their relative and intrinsic viscosities in sulfur at 132° C.

The more sulfur in the reaction mixture either as such or as sulfide, the lower generally is the softening point and the greater the plasticity of the resultant product. The inclusion of trichloro aromatics in a reaction mixture containing ortho or para or a mixture of ortho and para dichloro aromatics results in the production of stiffer and stronger resins. The properties of the final products can also be modified by including, at discretion, polar compounds in the reaction mixture, for example, small amounts of phenols, sulfonates, bases, etc.

The simple aromatic sulfides and polysulfides may be used as plasticizers, insecticides, fungicides, as addition agents for lubricating oils and in connection with ore flotation. The aromatic sulfide and polysulfide resins are usable as surfacing and sealing compounds, pigments, rubber compounding materials, rubber substitutes, and as molding powders of high thermal and chemical stability, having useful properties over a very wide temperature range. They are odorless and tasteless in a refined state. They are of particular commercial interest because of their relatively low potential material cost, the basic raw materials, such as benzene, chlorine, lime, or soda ash and sulfur being among the cheapest available raw materials.

The following examples are illustrative of this invention. It will be understood this invention is not limited to these examples.

In the following examples parts are by weight. In those cases where pressure is mentioned and the value is not given, the pressure used corresponds to the vapor pressure generated during the reaction. In all cases the reactions were carried out in closed vessels.

*Example 1*

A mixture of U. S. P. calcium sulfide (4 parts, 63.7% sulfide concentration), sulfur (0.233 part or 0.25 atom equivalent) and o-dichlorobenzene (4 parts or about 0.77 molecular equivalent) is heated 20 hours at 300°–310° C. in an autoclave with a glass liner. The product is isolated by extracting the cooled mixture with hot benzene or it may be distilled off directly from the mixture at about 250° C. and 25 mm. pressure. It is purified by redistillation over copper powder. It comprises practically pure, colorless crystals of thianthrene, melting at 160° C. The yield is 75% or more based on the o-dichlorobenzene. The chief by-product is a benzene-soluble, fusible resin which is left behind in the distillation.

For comparative purposes a similar treatment of equal parts of U. S. P. calcium sulfide and o-dichlorobenzene, but without any added sulfur, was carried out and resulted in little or no thianthrene formation, the reaction product being chiefly unchanged calcium sulfide and o-dichlorobenzene.

*Example 2*

A mixture of calcium oxide powder (2.5 parts calcined slaked lime), sulfur (1.43 parts or 1 atom equivalent) and monochlorobenzene (4.52 parts) is heated under pressure for 20 hours at 295°–305° C. The product is isolated from the cooled mixture by extraction with carbon tetrachloride or by direct distillation. It comprises a mixture of phenyl sulfide and phenyl disulfide boiling at 292°–315° C. The yield is 75% by weight or more based on the monochlorobenzene. The chief by-product is a soluble resin which becomes plastic at 200° C.

*Example 3*

A mixture of calcium oxide powder (1 part), sulfur (0.57 part) and p-dichlorobenzene (1 part) is heated 22 hours at 300°–315° C. in a closed vessel in absence of air. The hard yellow mass produced thereby is broken up and demineralized by warming with dilute hydrochloric acid. After washing and drying the resin recovered (1.33 parts) is in powder form and retains 0.9% ash. It is practically chlorine-free and has a sulfur content of 34.1%.

On heating, the resin compacts at 210° C., and is quite soft at 300° C. It is sufficiently plastic at 150°–160° C. for pressure molding, which produces hard, bright yellow, easily tooled, bone-like products. Moldings from this type of resin usually have a density of 1.5 or more, a low capacity for water absorption (0.4%) and a high impression hardness (in excess of 1300 kilograms per sq. cm.). The impact strength while not high is much improved by incorporating fibrous materials in the molding powders.

Substitution of magnesium oxide for the calcium oxide in the above reaction mixture leads to a resin of the same general character. Where an excess of the metal oxide is used the crude product is friable and easily removed from the apparatus.

*Example 4*

A mixture of calcium oxide (1 part), sulfur (1.86 parts) and p-dichlorobenzene (1.575 parts), was heated as in Example 3. The resultant product (2.65 parts) comprises a hard, opaque, lemon-yellow powder which becomes rubbery at 75°–190° C. and is more plastic than resilient at 200°–250° C. It is plastic enough at 140° C. to work like natural rubber. By heating this product at 150° C. with a plasticizer (e. g., sulfur) it is converted to products somewhat resembling rather stiff "pure gum" rubbers and which are tough and resilient from 130° C. down to and below 25° C. These rubber-like plastics lend themselves to molding at 150° C. into various forms by rolling, extruding, etc. The tensile strength of the product is about 800 pounds per square inch at 25° C. in the unvulcanized condition.

*Example 5*

A mixture comprising anhydrous sodium carbonate (1.9 parts) sulfur (1.86 parts) and p-dichlorobenzene (1.575 parts) was heated under the same conditions as in Example 3. In this case the product (2.49 parts) is recovered free from ash simply by extraction with water. It comprises a sulfur-colored powder which becomes plastic and resilient at 50°–150° C. and is semi-liquid at 200°–210° C. It is soluble in sulfur and hydrocarbon sulfides (such as phenyl sulfide or thianthrene) and is partly soluble in carbon bisulfide but is otherwise generally insoluble. It contains a slight amount of unreacted chlorine (1.1%) and has a sulfur content (65.2%) corresponding to an empirical formula of $(C_6H_4S_{4.5})_n$.

*Example 6*

A mixture of o- and p-dichlorobenzene (0.875 and 1.625 parts, respectively), powdered calcium oxide (2.5 parts) and sulfur (1.43 parts) is heated under pressure for 19 hours at 300°–315° C. The crude product is separated by digestion with warm dilute hydrochloric acid, is washed and dried, and is heated at 270°–280° C. and 25 mm. pressure to remove volatile products, including some thianthrene. The residue (2 parts) comprises a hard, greenish resin. It is impressionable at 45° C., forms a stiff rubber from 45°–80° C. and is more easily plastic at higher temperatures. When applied hot, it has a high adhesion or bonding strength (more than 1000 pounds per square inch) for soft wood at ordinary temperature. When drawn out while hot it has a marked fiber-forming tendency particularly if plasticized.

*Example 7*

A mixture of calcium oxide powder (2.5 parts), sulfur (1.43 parts), monochlorobenzene (1.53 parts) and p-dichlorobenzene (3 parts) is heated 15–16 hours at 290°–325° C. The product is worked up with dilute hydrochloric acid, is washed and dried, and freed from volatile byproducts (chiefly phenyl sulfide) by heating to 315° C. at 25 mm. pressure. After moving the last of the ash by solution in benzene the purified product (2.85 parts) comprises a clear, dark red, waxy resin. It is soluble in benzene, camphor, chloroform, carbon bisulfide and o-dichlorobenzene, partly soluble in carbon tetrachloride and insoluble in methanol, acetone and methylene chloride. It is thermally stable at temperatures above 300° C., has low water absorption, has low surface hardness at room temperature (18.3° C.), softens at 22° to 24° C., becomes brittle at 15° C., and is plastic in the range of 22° to 60° C. Its solutions can be used in leather and other surface dressings. When plasticized it forms a clear, sticky, yellow gum of the type used for adhesive tape.

*Example 8*

A mixture of sulfur (3 parts) and sodium carbonate (3.9 parts, obtained by heating sodium bicarbonate at 250°–300° C.) is pulverized together and p-dichlorobenzene (3.3 parts) is added. This is sealed up in a glass tube at about 25 mm. mercury pressure and heated 20 hours at 300°–340° C. After pulverizing, extracting with water and drying, the crude product (4.164 parts) is a sulfur colored resin containing 56.2% total sulfur and 9.4% labile sulfur.

The crude material is purified for analysis by continuous extraction with boiling toluene for about 6 hours. After drying at 140°–150° C. under reduced pressure, the purified resin is straw colored and brittle at ordinary temperature, resilient at 80°–180° C. and plastic from this temperature up to and above 350° C. In elementary composition, it corresponds to an empirical formula of $C_6H_4S_{2.3}$, and has a calculated composition of C 48.1, H 2.67, S 49.2% and a found composition of C 47.9–48.1, H 2.5–2.7, S 48.2–48.6%, also ash 0.3% and Cl less than 0.4%.

*Example 9*

A mixture of 1.2 parts of sulfur, 4 parts of anhydrous sodium carbonate and 3.3 parts of p-dichlorobenzene is heated as in Example 8, giving 2.4 parts of pale yellow crude resin, which is purified by extraction, as in Example 8. After drying, the recovery amounts to 87–88% of the crude. The resultant resin comprises a white powder, brittle cold, fusing fairly sharply at 255° C. It corresponds to an empirical composition of $(C_6H_4S_{1.2})$.

*Example 10*

A mixture of 3 parts of sulfur, 3.9 parts of anhydrous sodium carbonate, 3 parts of p-dichlorobenzene and 0.5 part of chlorobenzene, is heated 20 hours in a sealed, evacuated tube at 300°–325° C. and the cooled mixture, after removal, extracted with water after releasing the gas generated in the reaction. The dried product, 4.3 parts, contains 54.8% S and is a yellow, brittle resin, softening at 30°, becoming moderately fluid at 70°. It is easily soluble in carbon bisulfide and is recovered by evaporating the solvent (finally at 140°–180° under reduced pressure) as a clear, yellow, low-melting glass. The molecular weight is about 1500 grams. It is soluble in carbon bisulfide, partly soluble in o-dichlorobenzene, phenyl sulfide, toluene and sparingly soluble in xylene, monochlorobenzene and pyridine. It is thermally stable at temperatures above 300° C., has a low water absorption, high surface hardness at room temperature, is plastic in the range of from 30° to 70° C., and has a relative viscosity of about 5.

*Example 11*

A mixture of 1.2 parts of p-chlorobenzyl chloride, 1.3 parts of anhydrous sodium carbonate and 1.3 parts of sulfur was heated 20 hours under pressure at 290°–300° C., giving, on extracting with water and drying, 1.64 parts of brownish green resin, brittle below 110° C., stiffly resilient at 110°–200° C., plastic at 200°–350° C. It blends with sulfur at 190° C., giving a sort of rubber plastic.

*Example 12*

A mixture of 2.4 parts of sulfur, 4.0 parts of anhydrous sodium carbonate and 2.42 parts of 1,2,4,5-tetrachlorobenzene is heated under pressure for 20 hours at 300°–350° C. in a tube while rotating the tube. The cooled product, after removal, is worked up by pulverizing, extracting with water and drying, comprises 2.83 parts of pale green, non-plastic resin which is insoluble in sodium sulfide solutions. Purified by prolonged extraction with toluene and dried at 170°–180° C., the recovery is 64–65%. The sulfur content (53.6%) corresponds to that calculated for a composition having the empirical formula $C_6H_2S_{2.7}$. The indicated chlorine content is 1.1%. The resin remains unfused but turns orange in air at 250°–300° C.; it is chocolate-brown at 500° C.

*Example 13*

A similar starting mixture containing just half the sulfur in Example 12 gives 1.63 parts of lemon-yellow, non-plastic crude resin. Extracted with toluene and heat dried, the recovery is about 96%, and the purified resin has an indicated sulfur content of 42.6–43.2%. Heated in the air above 350° C., it turns a light yellow, Sienna brown.

Resin pigments of a generally similar character can be obtained in a like manner starting with other polychlorinated benzenes, such as 1,2,4-trichlorobenzene or hexachlorobenzene.

*Example 14*

An exceptionally high strength phenylene sulfide resin is obtained by fusing a mixture consisting of p-dichlorobenzene 3.3 parts, sulfur 1.1 parts and sodium carbonate 3.5 to 3.7 parts. The mixture is placed in a glass tube which is sealed, rotated and heated for 20 hours to about 300° C. A very tough resin results which can be pulverized by grinding under an alcohol and water mixture. The resin is pale yellow, is insoluble in sulfur at 132° C., is practically insoluble in acids, such as hydrochloric and sulfuric, dissolves with decomposition in hot strongly oxidizing acids, such as nitric acid and chrome sulfuric acid, is practically insoluble in alkalis, is substantially insoluble in organic solvents, such as alcohols, ketones, acids, esters, hydrocarbons, halo hydrocarbons, phenols, ethers and organic bases, is thermally stable at temperatures above 300° C., shows practically no water absorption, has good surface hardness about the same as polystyrene resins, becomes brittle below —60° C., softens at 120° C., is resilient at 120–240° C., becomes transparent at 255° C., is plastic from 260° to above 500° C., has a tensile strength of 13,000 pounds per square inch, a flexural strength of 14,000 pounds per square inch, and can be molded at 290° C. Molding results in a very tough amber colored horn.

A resin produced as described above, except that the reaction mixture, instead of p-dichlorobenzene, contained a mixture of 3.1 parts of p-dichlorobenzene and .16 part of 1,2,4-trichlorobenzene resulted in a resin having a tensile strength at 18° C. of 15,000 lbs. per square inch, resilient at temperatures from 120–260° C., molding at temperatures of 285–300° C. and freezing at 120° C. to an amber colored horn which remained tough and flexible down to —60° C. This resin was pale yellow in the powder state.

It will be noted this invention, involving as it does carrying out the reaction in the dry state, i. e., in the absence of water, alcohol or other such solvents, provides a process for producing aromatic sulfides which eliminates the difficulties and objections to prior art procedures including corrosion problems presented by the handling of aqueous reaction mixtures containing chlorine and sulfur. Furthermore, this invention results in the economic production of resin products of wide commercial utility.

This application is a continuation in part of application Serial No. 645,485 filed February 4, 1946.

What is claimed is:

1. A process for producing a sulfide of a benzene hydrocarbon, which comprises fusing a reaction mixture consisting essentially of a nuclearly substituted chlorobenzene hydrocarbon in the liquid phase, a sulfide of a metal from the group consisting of alkali and alkaline earth metals and sulfur at a temperature of 275° to 360° C. and under superatmospheric pressure.

2. A process for producing a sulfide of a benzene hydrocarbon, which comprises fusing a reaction mixture consisting essentially of a nuclearly substituted chlorobenzene hydrocarbon in the liquid phase, sulfur and a metal sulfide produced in situ from sulfur and a compound from the group consisting of monoxides, carbonates and borates of a metal from the group consisting of alkali and alkaline earth metals at a temperature of 275° to 360° C. and at a pressure at least equal to the partial pressure of the nuclearly substituted chlorobenzene hydrocarbon at the reaction temperature, the amount of sulfur present being sufficient to convert the said compound to a sulfide.

3. A process as defined in claim 2, in which the metal compound is sodium carbonate.

4. A process for producing a polysulfide of a benzene hydrocarbon, which comprises fusing a reaction mixture consisting of a nuclearly substituted polychlorinated benzene hydrocarbon in the liquid phase, a sulfide of a metal from the group consisting of alkali and alkaline earth metals and sulfur at a temperature of 275° to 360° C. and under superatmospheric pressure.

5. A process for producing a polysulfide of a benzene hydrocarbon, which comprises fusing a reaction mixture consisting essentially of a nuclearly substituted polychlorinated benzene hydrocarbon in the liquid phase, sulfur and a metal sulfide produced in situ from sulfur and a compound from the group consisting of monoxides, carbonates and borates of a metal from the group consisting of alkali and alkaline earth metals at a temperature of 275° to 360° C. under superatmospheric pressure, the amount of sulfur present being sufficient to convert the said compound to a sulfide.

6. A process as defined in claim 5, in which the polychlorinated benzene hydrocarbon is p-dichlorobenzene and the metal compound is sodium carbonate.

7. A process for producing a polysulfide of a benzene hydrocarbon, which comprises fusing a reaction mixture consisting essentially of a nuclearly substituted chlorobenzene hydrocarbon in the liquid phase and a polysulfide of a metal from the group consisting of alkali and alkaline earth metals at a temperature of 275° to 360° C. under superatmospheric pressure.

8. A process for producing a polysulfide of a benzene hydrocarbon, which comprises fusing a reaction mixture consisting essentially of a nuclearly substituted polychlorinated benzene hydrocarbon in the liquid phase and a polysulfide of a metal consisting of alkali and alkaline earth metals at a temperature of 275° to 360° C. under superatmospheric pressure.

9. A resin having the empirical formula $C_6H_4S_x$, where $x$ is equal to a value of from 1 to 1.25, made by fusing a reaction mixture consisting essentially of p-dichlorobenzene, a sulfide of a metal from the group consisting of alkali and alkaline metals and sulfur at a temperature of 275° to 360° C. and at a pressure at least equal to the partial pressure of the p-dichlorobenzene at the reaction temperature.

10. A resin having the empirical formula $$C_6H_4S_x$$

where $x$ is equal to a value of from 1 to 1.25, made by fusing, at a temperature of 275° to 360° C. under superatmospheric pressure, a reaction mixture consisting essentially of p-dichlorobenzene, sodium carbonate and sulfur in amount to produce a resin containing from 30% to 34% by weight of sulfur.

11. A resin having the empirical formula $$C_6H_4S_x$$

where $x$ is equal to a value of from 2 to 5, made by fusing a reaction mixture consisting essentially of p-dichlorobenzene, a sulfide of a metal from the group consisting of alkali and alkaline earth metals and sulfur at a temperature of 275° to 360° C. under superatmospheric pressure, and which, dissolved in sulfur at a 5% by weight concentration of $C_6H_4S_2$, has a relative viscosity of 20 or more at 132° C.

12. A resin as defined in claim 11, made by fusing, at a temperature of 275° to 360° C. under superatmospheric pressure, a reaction mixture consisting essentially of p-dichlorobenzene, sodium carbonate and sulfur in amount to produce a resin containing from 48% to 68% by weight of sulfur.

13. A resin made by fusing a reaction mixture consisting essentially of a polychlorobenzene hydrocarbon, containing at least three chlorine atoms, a sulfide of a metal from the group consisting of alkali and alkaline earth metals and sulfur at a temperature of 275° to 360° C. and under superatmospheric pressure.

14. A resin made by fusing a reaction mixture consisting essentially of a polychlorobenzene hydrocarbon, containing at least three chlorine atoms, sodium carbonate and sulfur at a temperature of 275° to 360° C. under superatmospheric pressure.

15. A process as defined in claim 7, in which the metal polysulfide is sodium polysulfide.

ALEXANDER DOUGLAS MACALLUM.

REFERENCES CITED

The following references are of record in the file of this patent:

UNITED STATES PATENTS

| Number | Name | Date |
| --- | --- | --- |
| 1,884,762 | Lloyd | Oct. 25, 1932 |
| 2,050,370 | Orthner | Aug. 11, 1936 |
| 2,195,380 | Patrick | Mar. 26, 1940 |
| 2,513,188 | Macallum | June 27, 1950 |

OTHER REFERENCES

Vorozhtzov and Mitzendenler, Org. Chem. Ind. (U. S. S. R.), vol. 21 (pages 457) (1936), cited in Jour. Org. Chem., January 1948, pages 154–159).